(12) United States Patent
Oshima et al.

(10) Patent No.: US 8,686,656 B2
(45) Date of Patent: Apr. 1, 2014

(54) POWER SUPPLY DEVICE AND LIGHT-EMITTING ELEMENT DRIVE DEVICE

(71) Applicant: TDK Corporation, Tokyo (JP)

(72) Inventors: Kazunori Oshima, Tokyo (JP); Hironobu Masuoka, Tokyo (JP); Mitsuyuki Tsujisaka, Tokyo (JP)

(73) Assignee: TDK Corporation (JP)

( * ) Notice: Subject to any disclaimer, the term of this patent is extended or adjusted under 35 U.S.C. 154(b) by 34 days.

(21) Appl. No.: 13/623,401

(22) Filed: Sep. 20, 2012

(65) Prior Publication Data

US 2013/0076258 A1 Mar. 28, 2013

(30) Foreign Application Priority Data

Sep. 22, 2011 (JP) ................. 2011-207210

(51) Int. Cl.
  *H05B 37/02* (2006.01)
  *H05B 33/08* (2006.01)
  *H02M 3/157* (2006.01)
(52) U.S. Cl.
  CPC ........... *H05B 33/0815* (2013.01); *H02M 3/157* (2013.01)
  USPC ..................................... 315/209 R; 315/210
(58) Field of Classification Search
  CPC ... H02M 3/156; H02M 3/157; H05B 33/0815
  USPC ................. 315/209 R, 210, 209 CD; 323/283
  See application file for complete search history.

(56) References Cited

U.S. PATENT DOCUMENTS

| 8,030,910 B2 * | 10/2011 | Lima et al. ..................... 323/282 |
| 2008/0116818 A1 * | 5/2008 | Shteynberg et al. .......... 315/192 |
| 2011/0187276 A1 * | 8/2011 | Shteynberg et al. .......... 315/186 |

FOREIGN PATENT DOCUMENTS

JP 09-331017 12/1997

* cited by examiner

*Primary Examiner* — Jason M Crawford
(74) *Attorney, Agent, or Firm* — Harness, Dickey & Pierce, P.L.C.

(57) ABSTRACT

A power supply device includes a converter and an arithmetic circuit. The arithmetic circuit calculates a present control command value at predetermined intervals based on a digital value, which reflects an output voltage of a converter, from a conversion circuit. The arithmetic circuit calculates the difference value between the present control command value and a previous control command value. Based on the difference value, it is determined whether a signal output circuit outputs a high-level signal toward a charge terminal or a low-level signal toward a discharge terminal. As a result, the number of output lines corresponds to at least the number of charge terminals and discharge terminals. The above features can be achieved with a simple circuit configuration by adding a discharge and charge circuit and without increasing the number of output lines.

12 Claims, 5 Drawing Sheets

POWER SUPPLY DEVICE AND LIGHT-EMITTING ELEMENT DRIVE DEVICE

CROSS-REFERENCE TO RELATED APPLICATION

This application claims priority to Japanese Patent Application No. 2011-207210 filed Sep. 22, 2011 which is hereby expressly incorporated by reference herein in its entirety.

BACKGROUND

The present invention relates to a power supply device and a light emitting element drive device. Specifically, the power supply device and the light emitting element drive device perform pulse width modulation (PWM) control by using a microprocessor.

Japanese Patent Publication No. H09-331017 discloses a light emitting element drive device. In the disclosed light emitting element drive device, a pulse oscillator generates a driving signal with a predetermined duty ratio based on a digital signal corresponding to a calculated value that is a control command value calculated by a microprocessor as a digital circuit. When the digital signal is a 10 bit signal, a duty ratio of the driving signal is changed based on its digital values in a range of 0 through 1023.

The steps that adjust the duty ratio depend on the number of bits of the digital signal. When a duty ratio is finely adjusted, the number of bits of a digital signal increases. When the number of bits of a digital signal increases, the number of lines for the output signals from the microprocessor increases. However, the number of lines for output signals from a microprocessor can decrease when a driving signal is generated inside the microprocessor. Therefore, the frequency of an operation clock has to be high in order to finely adjust a duty ratio.

An object of the present invention is to provide a power supply device and a light emitting element drive device in which a driving signal with a finely adjusted duty ratio can be generated by an operation clock signal having a lower frequency than the conventional device. The above features can be achieved with a simple circuit configuration and without increasing the number of lines for the output signals from a digital circuit.

SUMMARY

A power supply device according to one aspect of the present invention includes: a converter that supplies electric power by performing an ON and OFF operation of a switching element; a voltage detector that detects a voltage value of an output voltage of the converter; a conversion circuit that converts the voltage value into a digital value; an arithmetic circuit that receives an operation clock signal, that respectively calculates first and second control command values at different timings based on the digital value and that calculates a difference value between the first and second control command values; a signal output circuit that outputs a first signal or a second signal toward a discharge and charge terminal, that includes a charge terminal and a discharge terminal as a pair, based on the difference value calculated by the arithmetic circuit and that adjusts the output periods of the first signal and the second signal; a discharge and charge circuit that includes a capacitor; a ramp signal generation circuit that outputs a ramp signal synchronized to a clock signal generated based on the operation clock signal; and a driving signal generation circuit that generates a driving signal based on a comparison result of comparing the ramp signal with a voltage between both terminals of the capacitor. The switching element preforms the ON and OFF operation according to the driving signal. A logic level of the first signal may be higher than a logic level of the second signal. Thus, the first signal is a high-level signal. The second voltage is a low-level signal. When the charge terminal outputs the first signal, the capacitor is charged. When the discharge terminal outputs the second signal, the capacitor is discharged. Further, the number of charge terminals may be two or more, and the number of discharge terminals may be two or more.

In the power supply device according to the above aspect, the arithmetic circuit calculates a present control command value at predetermined intervals based on the digital value, which reflects the output voltage of the converter, from the conversion circuit. The arithmetic circuit calculates the difference value between the present control command value and a previous control command value. Based on the difference value, it is determined whether the signal output circuit outputs the high-level signal toward the discharge and charge terminal or whether the signal output circuit outputs the low-level signal toward the discharge and charge terminal. In addition, the signal output circuit determines the output periods of the high-level signal and the low-level signal. As a result, the output voltage of the converter becomes stable by discharging and charging the capacitor of the discharge and charge circuit. Therefore, the number of output lines for the output signals from a digital circuit, such as a microprocessor, does not increase as compared with the above conventional technology. The number of output lines from a digital circuit is appropriate if they correspond to at least the number of charge terminals and discharge terminals.

Further, the frequency of the driving signal generated by the driving signal generation circuit is the same as the frequency of the ramp signal. Further, the frequency of the ramp signal is synchronized with the clock signal. Therefore, not only a frequency of the clock signal but also a frequency of the driving signal can be determined in consideration of the specifications of the converter, instead of a processing time for which the arithmetic circuit calculates the control command values and the difference value. On the other hand, the frequencies of the high-level signal toward the charge terminal and the low-level signal toward the discharge terminal having output periods determined based on the difference value may be lower than the frequency of the ramp signal. Thus, when a duty ratio of the driving signal should be finely adjusted, it is not necessary to purposely increase the frequency of the operation clock signal.

As explained above, the driving signal with a finely adjusted duty ratio can be generated by an operation clock signal having a lower frequency than the conventional device. The above features can be achieved with a simple circuit configuration by adding the discharge and charge circuit and without increasing the number of output lines for the output signals from the digital circuit.

A power supply device according to another aspect of the present invention includes: a converter that supplies electric power by performing a first ON and OFF operation of a first switching element; a voltage detector that detects a voltage value of an output voltage of the converter; a conversion circuit that converts the voltage value into a digital value; an arithmetic circuit that receives an operation clock signal, that respectively calculates first and second control command values at different timings based on the digital value and that calculates a difference value between the first and second control command values; a signal output circuit that outputs a first signal or a second signal toward a discharge and charge terminal and the first signal or the second signal toward a control terminal based on the difference value calculated by the arithmetic circuit and that adjusts the output periods of the first signal and the second signal; a discharge and charge circuit that includes a capacitor and a second switching element, the second switching element being provided between the discharge and charge terminal and the capacitor; a ramp signal generation circuit that outputs a ramp signal synchronized to a clock signal generated based on the operation clock signal; and a driving signal generation circuit that generates a driving signal based on a comparison result of comparing the ramp signal with a voltage between both terminals of the capacitor. The first switching element preforms a first ON and OFF operation according to the driving signal. The second switching element performs a second ON and OFF operation based on the first and second signals from the control terminal. A logic level of the first signal may be higher than a logic level of the second signal. Thus, the first signal is a high-level signal. The second signal is a low-level signal. When the discharge and charge terminal outputs the first signal, the capacitor is charged. When the discharge and charge terminal outputs the second signal, the capacitor is discharged. Further, the number of discharge and charge terminals may be two or more, and the number of control terminals may be two or more.

In the power supply device according to the above aspect, the arithmetic circuit calculates a present control command value at predetermined intervals based on the digital value, which reflects the output voltage of the converter, from the conversion circuit. The arithmetic circuit calculates the difference value between the present control command value and a previous control command value. Based on the difference value, it is determined whether the signal output circuit outputs the high-level signal or the low-level signal toward the discharge and charge terminal and whether the signal output circuit outputs the high-level signal or the low-level signal towards the control terminal. In addition, the signal output circuit determines the output periods of the high-level signal and the low-level signal. As a result, the output voltage of the converter becomes stable by discharging and charging the capacitor of the discharge and charge circuit. Therefore, the number of output lines for the output signals from a digital circuit, such as a microprocessor, does not increase as compared with the above conventional technology. The number of output lines from a digital circuit is appropriate if they correspond to at least the number of discharge and charge terminals and control terminals.

Further, the frequency of the driving signal generated by the driving signal generation circuit is the same as the frequency of the ramp signal. Further, the frequency of the ramp signal is synchronized with the clock signal. Therefore, not only a frequency of the clock signal but also a frequency of the driving signal can be determined in consideration of the specifications of the converter, instead of a processing time for which the arithmetic circuit calculates the control command values and the difference value. On the other hand, the frequencies of the high-level signals or the low-level signals toward the discharge and charge terminals and the control terminal having output periods determined based on the difference value may be lower than the frequency of the ramp signal. Thus, when a duty ratio of the driving signal should be finely adjusted, it is not necessary to purposely increase the frequency of the operation clock signal.

As explained above, the driving signal with a finely adjusted duty ratio can be generated by the operation clock signal having a lower frequency than the conventional device.

The above features can be achieved with a simple circuit configuration by adding the discharge and charge circuit and without increasing the number of output lines for the output signals from the digital circuit.

A light emitting drive device according to another aspect of the present invention includes: a converter that supplies electric power by performing an ON and OFF operation of a switching element; a light emitting element that is driven by the electric power supplied from the converter; a current detector that detects a current value of a current flowing in the light emitting element; a conversion circuit that converts the current value into a digital value; an arithmetic circuit that receives an operation clock signal, that respectively calculates first and second control command values at different timings based on the digital value and that calculates a difference value between the first and second control command values; a signal output circuit that outputs a first signal or a second signal toward a discharge and charge terminal, that includes a charge terminal and a discharge terminal as a pair, based on the difference value calculated by the arithmetic circuit and that adjusts the output periods of the first signal and the second signal; a discharge and charge circuit that includes a capacitor; a ramp signal generation circuit that outputs a ramp signal synchronized to a clock signal generated based on the operation clock signal; and a driving signal generation circuit that generates a driving signal based on a comparison result of comparing the ramp signal with a voltage between both terminals of the capacitor. The switching element preforms the ON and OFF operation according to the driving signal. A logic level of the first signal may be higher than a logic level of the second signal. Thus, the first signal is a high-level signal. The second signal is a low-level signal. When the charge terminal outputs the first signal, the capacitor is charged. When the discharge terminal outputs the second signal, the capacitor is discharged. Further, the number of charge terminals may be two or more, and the number of discharge terminals may be two or more.

In the light emitting drive device according to the above aspect of the present invention, the arithmetic circuit calculates a present control command value at predetermined intervals based on the digital value, which reflects the output current for the light emitting element, from the conversion circuit. The arithmetic circuit calculates the difference value between the present control command value and a previous control command value. Based on the difference value, it is determined whether the signal output circuit outputs the high-level signal toward the discharge and charge terminal or whether the signal output circuit outputs the low-level signal toward the discharge and charge terminal. In addition, the signal output circuit determines the output periods of the high-level signal and the low-level signal. As a result, the output voltage of the converter becomes stable by discharging and charging the capacitor of the discharge and charge circuit. Thus, an operation of the light emitting element becomes stable by stabilizing the output current Iout for the light emitting element. Therefore, the number of output lines for the output signals from a digital circuit, such as a microprocessor, does not increase as compared with the above conventional technology. The number of output lines is appropriate if they correspond to at least the number of charge terminals and discharge terminals.

Further, the frequency of the driving signal generated by the driving signal generation circuit is the same as the frequency of the ramp signal. Further, the frequency of the ramp signal is synchronized with the clock signal. Therefore, not only a frequency of the clock signal but also a frequency of the driving signal can be determined in consideration of the specifications of the converter, instead of a processing time for which the arithmetic circuit calculates the control command values and the difference value. On the other hand, the frequencies of the high-level signal toward the charge terminal and the low-level signal toward the discharge terminal having output periods determined based on the difference value may be lower than the frequency of the ramp signal. Thus, when a duty ratio of the driving signal should be finely adjusted, it is not necessary to purposely increase the frequency of the operation clock signal.

As explained above, the driving signal with a finely adjusted duty ratio can be generated by the operation clock signal having a lower frequency than the conventional device. The above features can be achieved with a simple circuit configuration by adding the discharge and charge circuit and without increasing the number of output lines for the output signals from the digital circuit.

A light emitting drive device according to another aspect of the present invention includes: a converter that supplies electric power by performing a first ON and OFF operation of a first switching element; a light emitting element that is driven by the electric power supplied from the converter; a current detector that detects a current value of a current flowing in the light emitting element; a conversion circuit that converts the current value into a digital value; an arithmetic circuit that receives an operation clock signal, that respectively calculates first and second control command values at different timings based on the digital value and that calculates a difference value between the first and second control command values; a signal output circuit that outputs a first signal or a second signal toward a discharge and charge terminal and the first signal or the second signal toward a control terminal based on the difference value calculated by the arithmetic circuit and that adjusts the output periods of the first signal and the second signal; a discharge and charge circuit that includes a capacitor and a second switching element, the second switching element being provided between the discharge and charge terminal and the capacitor; a ramp signal generation circuit that outputs a ramp signal synchronized to a clock signal generated based on the operation clock signal; and a driving signal generation circuit that generates a driving signal based on a comparison result of comparing the ramp signal with a voltage between both terminals of the capacitor. The first switching element preforms a first ON and OFF operation according to the driving signal. The second switching element performs a second ON and OFF operation based on the first and second signals from the control terminal. A logic level of the first signal may be higher than a logic level of the second signal. Thus, the first signal is a high-level signal. The second signal is a low-level signal. When the discharge and charge terminal outputs the first signal, the capacitor is charged. When the discharge and charge terminal outputs the second signal, the capacitor is discharged. Further, the number of discharge and charge terminals may be two or more, and the number of control terminals may be two or more.

In the light emitting drive device according to the above aspect, the arithmetic circuit calculates a present control command value at predetermined intervals based on the digital value, which reflects the output current for the light emitting element, from the conversion circuit. The arithmetic circuit calculates the difference value between the present control command value and a previous control command value. Based on the difference value, it is determined whether the signal output circuit outputs the high-level signal or the low-level signal toward the discharge and charge terminal and whether the signal output circuit outputs the high-level signal or the low-level signal toward the control terminal. In addition, the signal output circuit determines the output periods of the high-level signal and the low-level signal. As a result, the output voltage of the converter becomes stable by discharging and charging the capacitor of the discharge and charge circuit. Thus, an operation of the light emitting element becomes stable by stabilizing the output current Iout for the light emitting element. Therefore, the number of output lines for the output signals from a digital circuit, such as a microprocessor, does not increase as compared with the above conventional technology. The number of output lines is appropriate if they correspond to at least the number of the discharge and charge terminals and the control terminal.

Further, the frequency of the driving signal generated by the driving signal generation circuit is the same as the frequency of the ramp signal. Further, the frequency of the ramp signal is synchronized with the clock signal. Therefore, not only a frequency of the clock signal but also a frequency of the driving signal can be determined in consideration of the specifications of the converter, instead of a processing time for which the arithmetic circuit calculates the control command values and the difference value. On the other hand, the frequencies of the high-level signals or the low-level signals toward the discharge and charge terminal and the control terminal having output periods determined based on the difference value may be lower than the frequency of the ramp signal. Thus, when a duty ratio of the driving signal should be finely adjusted, it is not necessary to purposely increase the frequency of the operation clock signal.

As explained above, the driving signal with a finely adjusted duty ratio can be generated by the operation clock signal having a lower frequency than the conventional device. The above features can be achieved with a simple circuit configuration by adding the discharge and charge circuit and without increasing the number of output lines for the output signals from the digital circuit.

DESCRIPTION OF EXEMPLARY EMBODIMENTS

A power supply device and a light emitting drive device according to embodiments of the present invention will be explained below with reference to the drawings.

Figure 1:
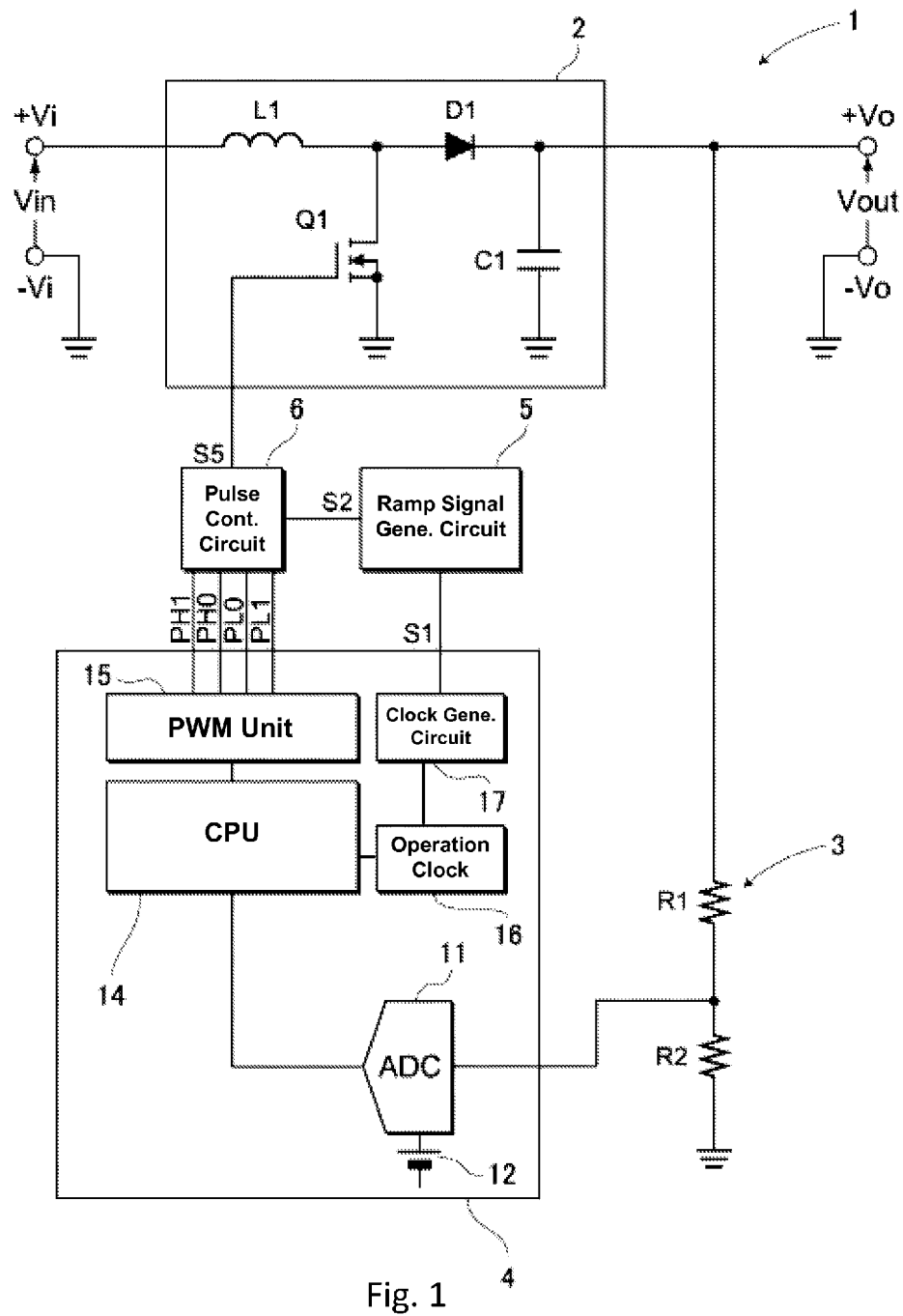
FIG. 1 is a circuit diagram of a power supply device according to a first embodiment of the present invention.

FIG. 1 shows a power supply device according to a first embodiment of the present invention. The power supply device according to the first embodiment has a configuration of a constant voltage output circuit block 1 in which an output voltage Vout is controlled as a stable voltage. The constant voltage output circuit block 1 is configured with a converter 2 that is an object to be controlled, a voltage detection circuit 3 that forms a voltage feedback loop for the converter 2, a microprocessor 4, a ramp signal generation circuit 5, and a pulse control circuit 6. Note that the converter 2 shown in FIG. 1 is a step-up type converter.

The converter 2 converts a direct current input voltage Vin, which is applied between input terminals +Vi and −Vi, to a direct current output voltage Vout and supplies the direct current output voltage Vout to output terminals +Vo and −Vo. A load (not shown) is connected between the output terminals +Vo and −Vo. The converter 2 is configured with a step-up chopper circuit in order to convert the input voltage Vin into the output voltage Vout that is higher than the input voltage Vin. The step-up chopper circuit includes a choke coil L1, a switching element Q1, a diode D1, and a capacitor C1. Specifically, a series circuit of the choke coil L1 and the switching element Q1 is connected between the input terminals +Vi and −Vi. A series circuit of the diode D1 and the capacitor C1 is connected between both terminals of the switching element Q1. The output terminals +Vo and −Vo are respectively connected to both terminals of the capacitor C1. The switching element Q1 is an N channel MOSFET (Metal Oxide Semiconductor Field Effect Transistor). However, the switching element Q1 is not limited to this and may be other semiconductor elements with a control terminal, such as a bipolar transistor.

The voltage detection circuit 3 detects the output voltage Vout from the converter 2. The voltage detection circuit 3 is configured by connecting a series circuit of resistors R1 and R2 for dividing a voltage between the output terminals +Vo and −Vo. An analog detection voltage having a voltage value, which is obtained by dividing the output voltage Vout, is generated at a node between the resistors R1 and R2.

The microprocessor 4 corresponding to a digital circuit calculates a control command value, which is for stabilizing the output voltage Vout, by digital arithmetic. The microprocessor 4 includes an analog-to-digital converter (ADC) 11, a reference power supply 12, a central processing unit (CPU) 14, a pulse width modulation (PWM) unit 15, an operation clock 16, and a clock generation circuit 17.

The ADC 11 corresponds to an analog-to-digital conversion circuit in which a voltage value (analog detection voltage) from the voltage detection circuit 3 is converted into a digital value. Further, the reference power supply 12 generates a reference voltage as a reference signal that is used when the ADC 11 converts an analog value into a digital value.

The CPU 14 corresponds to an arithmetic circuit in which a digital control command value is calculated based on a digital signal obtained by the ADC 11, and then in which a difference value between a previous control command value calculated the last time and a present control command value calculated at the present time is calculated. Further, based on the difference value calculated by the CPU 14, the PWM unit 15 corresponds to a signal output circuit in which a high(H)-level signal or a low(L)-level signal is respectively output toward at least two or more charge terminals PH0, PH1 and discharge terminals PL0, PL1 outside the microprocessor 4.

The operation clock 16 outputs an operation clock signal that operates the CPU 14 at a predetermined cycle. Further, the clock generation circuit 17 is provided as a frequency divider in which a clock signal (synchronous clock signal) S1, which is obtained by dividing the operation clock signal from the operation clock 16, is output from the microprocessor 4. In the present embodiment, the operation clock signal of, for example, 8 MHz from the operation clock 16 is divided into a 1/16 frequency by the clock generation circuit 17. Then, the clock signal S1 of 500 kHz is sent to the ramp signal generation circuit 5. The clock signal S1 is for determining a frequency of a driving signal S5 as discussed later.

The microprocessor 4 includes another clock generation circuit (not shown) that outputs a clock signal having a lower frequency than the clock signal S1 to the PWM unit 15 by dividing the operation clock signal from the operation clock 16. In this embodiment, an operation clock signal of, for example, 8 MHz from the operation clock 16 is divided into a 1/256 frequency by another clock generation circuit. Then, the clock signal of 31.25 kHz is sent to the PWM unit 15. Therefore, the PWM unit 15 can send distinct and separate signals of 31.25 kHz to the pulse control circuit 6 from each of the discharge terminals PL0, PL1 and charge terminals PH0, PH1. Accordingly, the CPU 14 selects a new control command value every 256 clock cycle of an operation clock signal. A generic I/O port (not shown) may substitute for the PWM unit 15, the discharge terminal PL0, PL1 and the charge terminals PH0, PH1. In this case, distinct and separate signals created through software and by synchronizing with a conversion cycle of the ADC 11 or a frequency of a generic timer (not shown) may be output to the pulse control circuit 6.

The ramp signal generation circuit 5 generates a serration-shaped or sawtooth wave signal S2 (ramp signal S2) based on a clock signal S1 from the microprocessor 4. The ramp signal S2 having the same frequency as the clock signal S1 is output to the pulse control circuit 6 from the ramp signal generation circuit 5.

Figure 2:
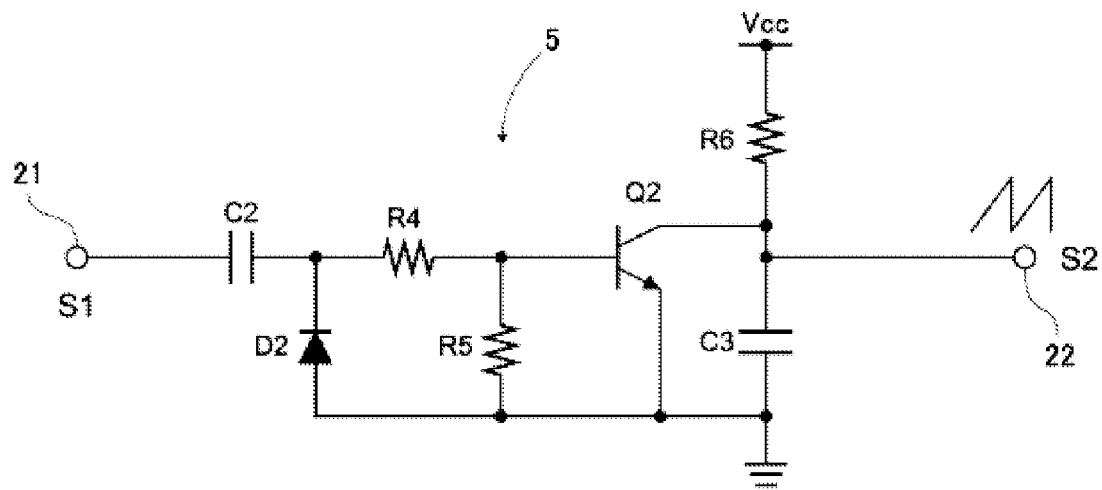
FIG. 2 is a circuit diagram of a ramp signal generation circuit of the power supply device shown in FIG. 1.

FIG. 2 is a circuit diagram of the ramp signal generation circuit 5. In FIG. 2, the ramp signal generation circuit 5 is configured with a switching element Q2, capacitors C2, C3, a diode D2, and resistors R4, R5 and R6. Specifically, one end of the capacitor C2 is connected to an input terminal 21 for the clock signal S1. Another end of the capacitor C2 is connected to a cathode of the diode D2 and to one end of the resistor R4. Another end of the resistor R4 is connected to one end of the resistor R5 and to a base of an NPN-type transistor as the switching element Q2. One end of the resistor R6 is connected to a line of an operation voltage Vcc from an internal power supply (not shown). Another end of the resistor R6 is connected to a collector of the switching element Q2 and to one end of the capacitor C3. Further, an anode of the diode D2, another end of the resistor R5, an emitter of the switching element Q2, and another end of the capacitor C3 are commonly connected to a ground line. Lastly, a collector of the switching element Q2 that is a node between the resistor R6 and the capacitor C3 is connected to an output terminal 22 for the ramp signal S2. The ramp signal generation circuit 5 is configured with the above structure.

Referring back to FIG. 1, the pulse control circuit 6 outputs a driving signal S5, which has a pulse width based on an H-level signal toward the charge terminals PH0, PH1 and an L-level signal toward the discharge terminals PL0, PL1, to a gate as a control terminal of the switching element Q1 by the same cycle of the ramp signal S2 from the ramp signal generation circuit 5.

Figure 3:
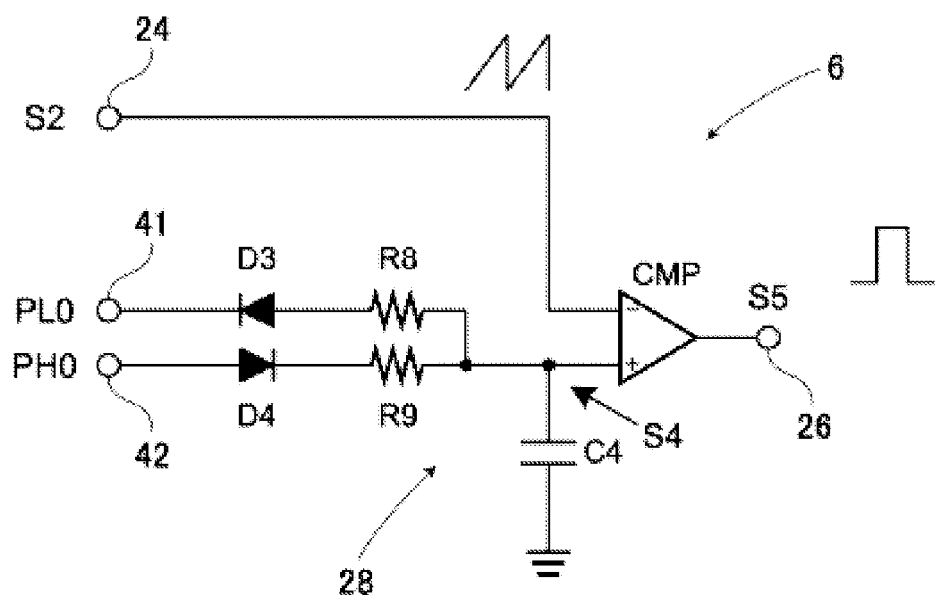
FIG. 3 is a circuit diagram of a pulse control generation circuit of the power supply device shown in FIG. 1.

FIG. 3 is a circuit diagram of the pulse control circuit 6. FIG. 3 shows an exemplary circuit configuration in which the PWM unit 15 shown in FIG. 1 has only one discharge and charge terminal including one discharge terminal PL0 and one charge terminal PH0 as a pair. In FIG. 3, the pulse control circuit 6 is configured with a discharge and charge circuit 28 and a comparator CMP. The discharge and charge circuit 28 is configured with a capacitor C4, diodes D3, D4, and resistors R8, R9. Specifically, one of input terminals, an inverting input terminal, of the comparator CMP is connected to an input terminal 24 for the ramp signal S2. A cathode of the diode D3 is connected to an input terminal 41 that is connected to the discharge terminal PL0 of the PWM unit 15. An anode of the diode D4 is connected to an input terminal 42 that is connected to the charge terminal PH0 of the PWM unit 15. One end of the resistor R8 is connected to an anode of the diode D3. One end of the resistor R9 is connected to a cathode of the diode D4. Another input terminal, a non-inverting input terminal, of the comparator CMP is connected to a node connected among one end of the capacitor C4 and the other ends of the resistors R8, R9. Another end of the capacitor C4 is connected to a ground line. An output terminal of the comparator CMP is connected to an output terminal 26 for the driving signal S5. The pulse control circuit 6 is configured with the above structure.

Figure 4:
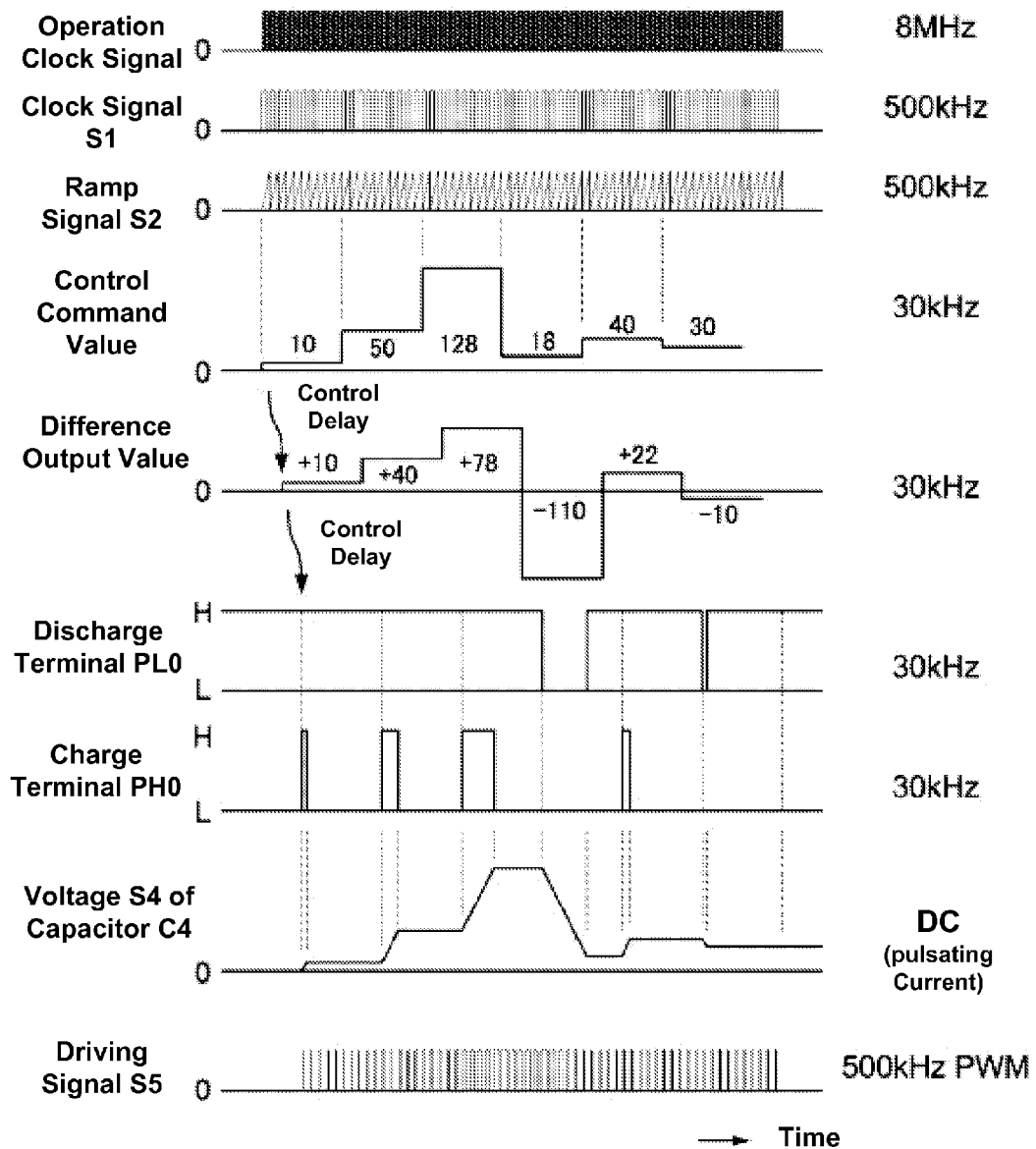
FIG. 4 is a timing diagram of each part of the power supply device shown in FIG. 1.

Next, functions of the above configuration are explained with reference to a timing diagram of each part shown in FIG. 4. In FIG. 4, the top one is the operation clock signal from the operation clock 16 followed by the clock signal S1, the ramp signal S2, the control command value generated by the CPU 14, a difference output value, a signal level of the discharge terminal PL0, a signal level of the charge terminal PH0, an end-to-end voltage S4 of the capacitor C4 (a voltage S4 between both terminals of the capacitor C4) shown in FIG. 3, and the driving signal S5.

When the pulsed driving signal S5 is input to a gate of the switching element Q1 from the pulse control circuit 6, the switching element Q1 repeats an ON and OFF operation. When the switching element Q1 is turned ON, the diode D1 is in an OFF state because an input voltage Vin is applied to a choke coil L1. Then a discharge voltage, as an output voltage Vout, of the smoothing capacitor C1 is supplied to a load from the output terminals +Vo, −Vo. When the switching element Q1 is turned OFF, the diode D1 is in an ON state because a reverse voltage of the choke coil L1 is overlapped with the input voltage Vin. Then, the output voltage Vout that is higher than the input voltage Vin is supplied to the load from the output terminals +Vo, −Vo and at the same time the capacitor C1 is charged through the diode D1.

The output voltage Vout from the converter 2 is monitored by the voltage detection circuit 3. The voltage detection circuit 3 provides an analog detection voltage that is obtained by dividing the output voltage Vout by the resistors R1, R2 to the ADC 11 of the microprocessor 4. The ADC 11 converts the analog detection voltage into a digital value by using a reference voltage from the reference power supply 12 and provides the digital value to the CPU 14.

The CPU 14 calculates a control command value based on a value of the detection voltage obtained by the voltage detection circuit 3 and the ADC 11. In this case, when the output voltage Vout becomes higher, the control command value becomes lower. In contrast, when the output voltage Vout becomes lower, the control command value becomes higher. The calculated control command value is temporarily stored in a memory (not shown) to calculate the difference output value. After the CPU 14 reads a previous control command value, which is calculates at the previous time, from the memory, the CPU 14 calculates a difference between a present control command value, which is calculated at the present time, and the previous control command value. The difference output value is calculated with a predetermined controlled delay with respect to the control command values, which are calculated at a predetermined cycle and is sent to the PWM unit 15 from the CPU 14.

Based on the difference output value from the CPU 14, the PWM unit 15 determines a period of outputting an H-level signal toward the charge terminal PH0 and a period of outputting an L-level signal toward the discharge terminal PL0. In this case, when the difference output value is positive, the H-level signal is output toward the charge terminal PH0. In contrast, when the difference output value is negative, the L-level signal is output toward the discharge terminal PL0. When the absolute value of the difference output value becomes larger, the period of outputting the H-level signal toward the charged terminal PH0 or outputting the L-level signal toward the discharge terminal PL0 becomes longer. In contrast, when the absolute value of the difference output value becomes smaller, the period of outputting the H-level signal toward the charged terminal PH0 or outputting the L-level signal toward the discharge terminal PL0 becomes shorter.

A clock signal of about 30 kHz, which is obtained by dividing the operation clock signal from the operation clock 16 into a $1/256$ frequency, is input to the PWM unit 15. Thus, the PWM unit 15 generates the distinct and separate logic signals having the same frequencies as the clock signal for the charge terminals, such as PH0, and the discharge terminals, such as PL0. In order to achieve the above situation, the CPU 14 determines a new control command value and a difference output value at every frequency cycle. That frequency is the same as a frequency of the signal. In FIG. 4, the CPU 14 calculates each of the control command values, "10," "50," "128," "18," "40," and "30," in this order conforming to a frequency of the signal toward the charge terminal PH0 and the discharge terminal PL0.

After the CPU 14 calculates the present control command value, the CPU 14 calculates the difference value (difference output value) between the current and previous control command values. In FIG. 4, the CPU 14 calculates each of the control command values, "+10," "+40," "+78," "−110," "+22," and "−10," in this order and outputs them to the PWM unit 15. The PWM unit 15 provides a signal to the pulse control circuit 6 from the microprocessor 4. This signal acts as follows: according to duration that is in accordance with the absolute value of the difference output value, when the difference output value is positive, the charge terminal PH0 is switched to an H-level, and similarly when the difference output value is negative, the discharge terminal PL0 is switched to an L-level.

The microprocessor 4 provides the clock signal S1 from the clock signal generation circuit 17 to the ramp signal generation circuit 5 in addition to the signals that are output toward the charge terminal PH0 and the discharge terminal PL0. The ramp signal generation circuit 5 generates the ramp signal S2 by a discharging and charging operation of the capacitor C3 shown in FIG. 2 based on the clock signal S1 from the microprocessor 4. Specifically, after the clock signal S1 at the input terminal 21 is processed with waveform shaping to change it to a trigger signal through the capacitor C2 and is divided by the resistors R4, R5, the clock signal S1 is provided to the base of the switching element Q2. When a voltage level of this trigger signal increases, the capacitor C3 is discharged by turning ON the switching element Q2 between the emitter and the collector. On the other hand, when a voltage level of this trigger signal decreases, the capacitor C3 is charged because the operation voltage Vcc is supplied to the capacitor C3 through the resistor R6 by turning OFF the switching element Q2 between the emitter and the collector. That is, after the discharge of the capacitor C3 is performed in synchronization with a rising edge of the clock signal S1, the charge of the capacitor C3 starts. Therefore, the ramp signal S2 is synchronized with the clock signal S1 from the microprocessor 4. A frequency of the ramp signal S2 can be changed by changing a frequency of the clock signal S1.

In the discharge and charge circuit 28 of the pulse control circuit 6, when at least one I/O port of the microprocessor 4, the charge terminal PH0, outputs an H-level signal, which is the charge of the capacitor C4 is performed through the resistor R9 from the diode D4. Similarly, when at least another I/O port of the microprocessor 4, the discharge terminal PL0, outputs an L-level signal, which is the discharge of the capacitor C4 is performed through the resistor R8 from the diode D3. The input terminal 42 connected to the charge terminal PH0 and the capacitor C4 are connected through the diode D4 and the resistor R9, which configure a charge circuit. In this case, when the charge terminal PH0 outputs the H-level signal, the capacitor C4 can be charged by connecting the anode of the diode D4 to the input terminal 42. Similarly, the input terminal 41 connected to the discharge terminal PL0 and the capacitor C4 are connected through the diode D3 and the resistor R8, which configure a discharge circuit. In this case, when the discharge terminal PL0 outputs the L-level signal, the capacitor C4 can be discharged by connecting the cathode of the diode D3 to the input terminal 41. Here, because energy is required for discharging and charging the capacitor C4 of the discharge and charge circuit 28, a pull-up circuit connected to the charge terminal PH0 and a pull-down circuit connected to the discharge terminal PL0 are included in the PWM unit 15.

As explained above, the end-to-end voltage S4, which is the output voltage of the discharge and charge circuit 28, of the capacitor C4 is adjusted based on the duration of the H-level signal toward the charge terminal PH0 and the duration of the L-level signal toward the discharge terminal PL0. The above duration is determined based on the difference output value of the CPU 14. Specifically, as shown in FIG. 4, the end-to-end voltage S4 linearly increases by charging the capacitor C4 during a period for which the H-level signal is output toward the charge terminal PH0. Similarly, the end-to-end voltage S4 linearly decreases by discharging the capacitor C4 during a period for which the L-level signal is output toward the discharge terminal PL0. The end-to-end voltage S4 is held without discharging and charging the capacitor C4 during a period for which the L-level signal is output toward the charge terminal PH0 and the H-level signal is output toward the discharge terminal PL0. A discharging and charging time of the capacitor C4 is determined based on the difference output value calculated by the CPU 14. Its variable step at most should be shorter than a cycle time of the operation clock signal. Table 1 is a transition table in which the status of the end-to-end voltage S4 of the capacitor C4 is shown in relation to each logic level of the charge terminal PH0 and the discharge terminal PL0 in the pulse control circuit 6 shown in FIG. 3.

TABLE 1

| Charge Terminal PH0 | Discharge Terminal PL0 | Voltage S4 of Capacitor C4 |
|---|---|---|
| L | L | Decrease |
| L | H | Hold |
| H | L | Non-Use |
| H | H | Increase |

The ramp signal S2 from the ramp signal generation circuit 5 is input to the inverting input terminal of the comparator CMP of the pulse control circuit 6. The end-to-end voltage S4, which is the output voltage of the discharge and charge circuit 28, of the capacitor C4 is input to the non-inverting input terminal of the comparator CMP. The comparator CMP sends the pulse driving signal S5 with a duty ratio that is based on the comparison result between the voltage value of the ramp signal S2 and the end-to-end voltage S4 of the capacitor C4 to the gate of the switching element Q1. Therefore, the switching element Q1 performs an ON and OFF operation so as to make the output voltage Vout from the converter 2 a constant value. In the above discussed series of operations, the following configurations may be used in order to make the output voltage Vout from the converter 2 a constant value. The ADC 11 is configured to increase a digital value when a voltage value from the voltage detection circuit 3 decreases. The CPU 14 is configured to increase a control command value when the digital value from the ADC 11 increases. Alternatively, the following configurations may be used in order to make the output voltage Vout from the converter 2 a constant value. The ADC 11 is configured to decrease the digital value when the voltage value from the voltage detection circuit 3 decreases. The CPU 14 is configured to increase the control command value when the digital value from the ADC 11 decreases.

A frequency of the driving signal S5 is the same as a frequency of the ramp signal S2. A pulse width of the driving signal S5 is adjusted by the end-to-end voltage S4 of the capacitor C4. In the pulse control circuit 6 shown in FIG. 3, when the end-to-end voltage S4 of the capacitor C4 increases by comparing with the voltage level of the ramp signal S2, the driving signal S5 of a long ON-duty ratio is generated. Thus, when the end-to-end voltage S4 of the capacitor C4 is higher, a pulse width of the driving signal S5 by which the switching element is turned ON is wider. A frequency of signals that are output toward the charge terminal PH0 and the discharge terminal PL0 may be lower than a frequency of the ramp signal S2.

In the present embodiment, because the microprocessor 4 controls by with 8 bits, the output periods for an H-level signal toward the charge terminal PH0 and an L-level signal toward the discharge terminal PL0 are varied in a range of "(0 to 255) X cycle of operation clock signal (125 nanosecond (ns))." These output periods for signals are determined based on the operation clock signal (8 MHz) form the operation clock 16 and are varied in periodic stages in increments of 125 ns. The end-to-end voltage S4 of the capacitor C4 increases or decreases based on the output periods of the signals. Then, this end-to-end voltage S4 and the ramp signal S2 are respectively input to the comparator CMP. Therefore, a pulse width of the driving signal S5 that is output from the comparator CMP can be changed every one pulse while the end-to-end voltage S4 of the capacitor C4 increases or decreases.

A frequency (500 kHz) of the driving signal S5 is determined in consideration of a size of the choke coil L1 and a loss of switching of the switching element Q1. This is because when a frequency lowers, the size of the choke coil L1 becomes large, and when a frequency raises, the loss of switching of the switching element Q1 increases. The clock generation circuit 17 does not divide the operation clock signal in a $\frac{1}{16}$ frequency to secure a processing time for calculating a control command value by the CPU 14. Thus, a frequency of the clock signal S1 can be determined based on a specification of the converter 2.

In the present embodiment, a frequency of the operation clock signal is, for example, 500 kHz. However, the present embodiment is not limited to the above configuration to generate the operation clock signal of 500 kHz. For example, when the operation clock 16 also has functions of the clock generation circuit 17, a circuit configuration in which the driving signal S5 of 500 kHz remains the same can be realized. In this case, a frequency of a signal from the charge terminal PH0 and the discharge terminal PL0 is 1.95 kHz (500/256=1.95 kHz). It is preferred that the CPU 14 can calculate a new control command value every 256 clock cycle with respect to the operation clock signal so that it does not depend on a frequency of the operation clock signal.

Figure 5:
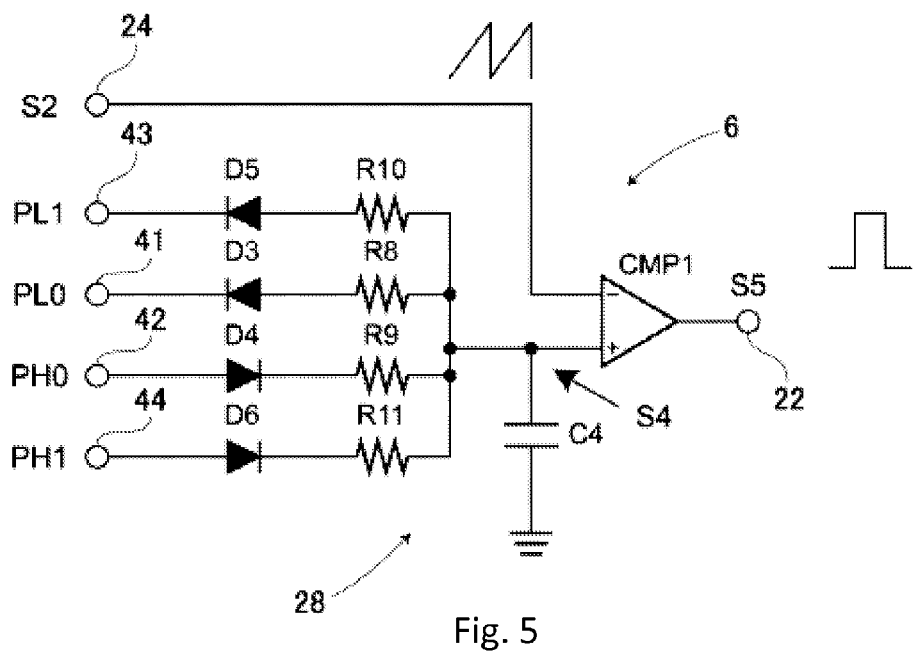
FIG. 5 is a circuit diagram of a pulse control circuit according to another embodiment. The pulse control circuit shown in FIG. 5 is a substitute example of the pulse control circuit shown in FIG. 3.

With respect to another application, the PWM unit 15 may have two pairs of discharge and charge terminals that are configured with several, for example two, charge terminals PH0, PH1 and several, for example two, discharge terminals PL0, PL1. In this case, the pulse control circuit 6 is shown in FIG. 5. FIG. 5 shows input terminals 43, 44, diodes D5, D6, and resistors R10, R11 in addition to the configuration of the pulse control circuit 6 shown in FIG. 3. The discharge and charge circuit 28 is configured with the capacitor C4, the diodes D3, D4, D5 and D6, and the resistors R8, R9, R10 and R11.

Specifically, a cathode of the diode D5 is connected to the input terminal 43 that is connected to the discharge terminal PL1 of the PWM unit 15. An anode of the diode D6 is connected to the input terminal 44 that is connected to the charge terminal PH1 of the PWM unit 15. One end of the resistor R10 is connected to an anode of the diode D5. One end of the resistor R11 is connected to a cathode of the diode D6. The non-inverting input terminal of the comparator CMP is connected to a node connected among the other ends of the resistors R10, R11, other end of the Resistors R8, R9 discussed above, and one end of the capacitor C4. Other configurations and functions are the same as discussed above.

In this embodiment, a charge current for the capacitor C4 can be selected from three different levels by differentiating a resistance value of the resistor R9 corresponding to one charge terminal PH0 from a resistance value of the resistor R11 corresponding to another charge terminal PH1. That is, the discharge and charge circuit 28 of the pulse control circuit 6 can select one state from the following three states: a charge by using only one charge terminal PH0; a charge by using only another charge terminal PH1; and a charge by using both charge terminals PH0, PH1. Similarly, with respect to a discharge of the capacitor C4, a discharge current for the capacitor C4 can be selected from three different levels by differentiating a resistance value of the resistor R8 corresponding to one discharge terminal PL0 from a resistance value of the resistor R10 corresponding to another discharge terminal PL1. In this case, because energy is required for discharging and charging the capacitor C4 of the discharge and charge circuit 28, a pull-up circuit connected to each of the charge terminals PH0, PH1 and a pull-down circuit connected to each of the discharge terminals PL0, PL1 are included in the PWM unit 15. Table 2 is a transition table in which the status of the end-to-end voltage S4 of the capacitor C4 is shown in relation to each logic level of the charge terminals PH0, PH1 and the discharge terminals PL0, PL1 in the pulse control circuit 6 shown in FIG. 5.

TABLE 2

| Charge Terminal PH1 | Discharge Terminal PL1 | Charge Terminal PH0 | Discharge Terminal PL0 | Voltage S4 of Capacitor C4 |
|---|---|---|---|---|
| L | L | L | L | Decrease 3 |
| L | L | L | H | Decrease 2 |
| L | L | H | L | Non-Use |
| L | L | H | H | Non-Use |
| L | H | L | L | Decrease 1 |
| L | H | L | H | Hold |
| L | H | H | L | Non-Use |

TABLE 2-continued

| Charge Terminal PH1 | Discharge Terminal PL1 | Charge Terminal PH0 | Discharge Terminal PL0 | Voltage S4 of Capacitor C4 |
|---|---|---|---|---|
| L | H | H | H | Increase 1 |
| H | L | L | L | Non-Use |
| H | L | L | H | Non-Use |
| H | L | H | L | Non-Use |
| H | L | H | H | Non-Use |
| H | H | L | L | Non-Use |
| H | H | L | H | Increase 2 |
| H | H | H | L | Non-Use |
| H | H | H | H | Increase 3 |

In the above transition table, for example, when a charge is performed by both the charge terminals PH0, PH1, the PWM unit 15 outputs H-level signals at the same time toward the charge terminals PH0, PH1. This state corresponds to the difference output value of "+78" calculated by the CPU 14 in the timing diagram of FIG. 4. This state is performed when a period of a ramp part corresponding to increase of the end-to-end voltage S4 of the capacitor C4 should be shortened. When both signals output toward the charge terminals PH0, PH1 are at H-levels at the same time, the capacitor C4 is rapidly charged through the diodes D4, D6. In this case, because an incline of the ramp part becomes steep, a target voltage value of the end-to-end voltage S4 of the capacitor C4 is achieved for a short period of time ("Increase 3" in Table 2) compared with the case in which a signal toward either one of the charge terminals PH0, PH1 is in an H-level. Further, when a signal toward either one of the charge terminals PH0, PH1 is in an H-level, an incline of the ramp part becomes gentle ("Increase 1" and "Increase 2" in Table 2) compared with the case in which both voltages output from the charge terminals PH0, PH1 are at H-levels at the same time. When the capacitor C4 is charged, discharging from the diodes D3, D5 is prevented by making both signals toward the discharge terminals PL0, PL1 at H-levels by the PWM unit 15.

When both signals output toward the discharge terminals PL0, PL1 are at L-levels at the same time, which is corresponding to the difference output value of "−110" calculated by the CPU 14 in FIG. 4, the capacitor C4 is rapidly discharged through the diodes D3, D5. In this case, because an incline of the ramp part for decreasing the end-to-end voltage S4 of the capacitor C4 becomes steep, a target voltage value of the end-to-end voltage S4 of the capacitor C4 is achieved for a short period of time ("Decrease 3" in Table 2) compared with the case in which a signal output toward either one of the discharge terminals PL0, PL1 is in an L-level. Further, when a signal output toward either one of the discharge terminals PL0, PL1 is in an L-level, an incline of the ramp part becomes gentle ("Decrease 1" and "Decrease 2" in Table 2) compared with the case in which both signals output toward the discharge terminals PL0, PL1 are at L-levels at the same time. When the capacitor C4 is discharged, charging from the diodes D4, D6 is prevented by making both signals output toward the charge terminals PH0, PH1 at L-levels by the PWM unit 15.

The periods of the ramp part in which the end-to-end voltage S4 of the capacitor C4 increases or decreases can be adjusted by the integral multiple of the minimum period (125 ns) that is determined based on the operation clock signal. However, as discussed in the above embodiment, discharging and charging operations for the capacitor C4 can be properly performed by adjusting an incline of the ramp part with several states by using several charge terminals PH0, PH1 and several discharge terminals PL0, PL1. In this case, a discharging and charging time of the capacitor C4 is determined based on the difference output value calculated by the CPU 14. Its variable step at most should be shorter than a cycle time of the operation clock signal.

Further, in the present embodiment, in the case in which a resistance value of the resistor R8 is, for example, larger than a resistance value of the resistor R10 and in which a resistance value of the resistor R9 is, for example, larger than a resistance value of the resistor R11, when the absolute value of a difference output value calculated by the CPU 14 is small, the capacitor C4 is discharged or charged by using the discharge terminal PL0 or the charge terminal PH0 that are connected to the resistors R8, R9 with the large resistance value, respectively. On the other hand, when the absolute value of a difference output value calculated by the CPU 14 is medium, which is larger than the value of the previous situation (small), the capacitor C4 is discharged or charged by using the discharge terminal PL1 or the charge terminal PH1 that are connected to the resistors R10, R11 with the small resistance value, respectively. When the absolute value of a difference output value is large, which is larger than the previous situation (medium), the capacitor C4 is discharged or charged by using both the discharge terminals PL0, PL1 or both the charge terminals PH0, PH1, respectively.

That is, the PWM unit 15 provides threshold values, "m" and "n," where n is larger than m (m<n), with respect to the absolute values of difference output valued calculated by the CPU 14. When the absolute value is equal to or more than "0" and less than the threshold value "m," the capacitor C4 is discharged or charged by using the discharge terminal PL0 or the charge terminal PH0, respectively. When the absolute value is equal to or more than the threshold value "m" and less than the threshold value "n," the capacitor C4 is discharged or charged by using the discharge terminal PL1 or the charge terminal PH1, respectively. When the absolute value is equal to or more than the threshold value "n," the capacitor C4 is discharged or charged by using both the discharge terminals PL0, PL1 or both the charge terminals PH0, PH1, respectively. In order to perform discharging and charging operations for the capacitor C4 as discussed above, each logic level of signals for the charge terminals PH0, PH1 and the discharge terminals PL0, P11 is assigned properly according to the above transition table (Table 2).

The PWM unit 15 discussed above may be designed with functions by which the incline of the ramp part is changeable at any time. For example, after the capacitor C4 is rapidly discharged or charged by using both the discharge terminals PL0, PL1 or the charged terminals PH0, PH1, respectively, based on the absolute value of the difference output value, the capacitor C4 is discharged or charged by using the discharge terminal PL0 or the charge terminal PH0 that are connected to the resistors R8, R9 with the large resistance values, respectively. Thus, the end-to-end voltage S4 of the capacitor C4 can be fine-tuned.

As discussed above, in the present embodiment, the configurations have two charge terminals PH0, PH1 and two discharge terminal PL0, PL1. However, the present embodiment is not limited to this. When the number of discharge and charge terminals (that include charge and discharge terminals as pairs) is three or more, the end-to-end voltage S4 of the capacitor C4 can be adjusted by more detailed and fine states and by a shorter time.

As discussed above, a power supply device according to the present embodiments includes the converter 2 that supplies electric power to a load by performing ON and OFF operations of the switching element Q1, and the microprocessor 4 as a digital circuit that calculates a control command value by a digital arithmetic and that controls the output voltage Vout from the converter 2 to a predetermined value. The power supply device also includes the voltage detection circuit 3 as a voltage detector that detects the output voltage Vout of the converter 2. The microprocessor 4 includes: the ADC 11 as a conversion circuit that converts the voltage value of an analog detection voltage detected by the voltage detection circuit 3 into a digital value; the CPU 14 as an arithmetic circuit that receives the operation clock signal, that respectively calculates the previous and present control command values at different timings based on the digital value from the ADC 11 and that calculates a difference output value between the previous and present control command values; and the PWM unit 15 as a signal output circuit that outputs logic signals toward at least one pair of discharge and charge terminals, i.e. an H-level signal toward at least one of the charge terminals PH0, PH1 and an L-level signal toward at least one of the discharge terminals PL0, PL1, based on the difference output value calculated by the CPU 14 and that adjusts the output periods of the H-level signal and the L-level signal for the discharge and charge terminal. Further, there are other elements located outside the microprocessor 4, such as the discharge and charge circuit 28 that include the capacitor C4, which is charged when the H-level signal is output toward the charge terminals PH0, PH1 and which is discharged when the L-level signal is output toward the discharge terminals PL0, PL1; the ramp signal generation circuit 5 that outputs a serration-shaped or sawtooth wave signal (ramp signal S2) synchronized to the clock signal S1 generated based on the operation clock signal provided to the CPU 14; and the comparator CMP as a driving signal generation circuit that generates the driving signal S5, which is for performing the ON and OFF operation of the switching element Q1, based on a comparison result of comparing the ramp signal S2 with the end-to-end voltage S4 of the capacitor C4.

In the above case, the CPU 14 calculates the present control command value at predetermined intervals based on the digital value, which reflects the output voltage Vout of the converter 2, from the ADC 11. The CPU 14 calculates the difference output value between the present control command value and the previous control command value. Based on the difference output value, it is determined whether the PWM unit 15 outputs the high-level signal toward the charge terminals PH0, PH1 or whether the PWM unit 15 outputs the low-level signal toward the discharge terminals PL0, PL1. In addition, the PWM unit 15 determines the output periods of the high-level signal and the low-level signal. As a result, the output voltage Vout of the converter 2 becomes stable by discharging and charging the capacitor C4 of the discharge and charge circuit 28. Therefore, it is appropriate that the number of output lines between the microprocessor 4 and the discharge and charge circuit 28 corresponds to at least the number of terminals of the charge terminals PH0, PH1 and the discharge terminals PL0, PL1.

Further, the frequency of the driving signal S5 generated by the comparator CMP is the same as the frequency of the ramp signal S2. Further, the frequency of the ramp signal S2 is synchronized with the clock signal S1. Therefore, not only a frequency of the clock signal S1 but also a frequency of the driving signal S5 can be determined in consideration of the specifications of the converter 2, instead of a processing time for which the CPU 14 calculates the control command values. On the other hand, the frequencies of the high-level signal toward the charge terminals PH0, PH1 and the low-level signal toward the discharge terminals PL0, PL1 having output periods that are determined based on the difference output value may be lower than the frequency of the ramp signal S2.

Thus, when a duty ratio of the driving signal S5 should be finely adjusted, it is not necessary to purposely increase the frequency of the operation clock signal.

As explained above, the driving signal S5 with a finely adjusted duty ratio can be generated by an operation clock signal having a lower frequency than the conventional device. The above features can be achieved with a simple circuit configuration by adding the discharge and charge circuit 28 and without increasing the number of output lines for the output signals from the microprocessor 4.

Figure 6:
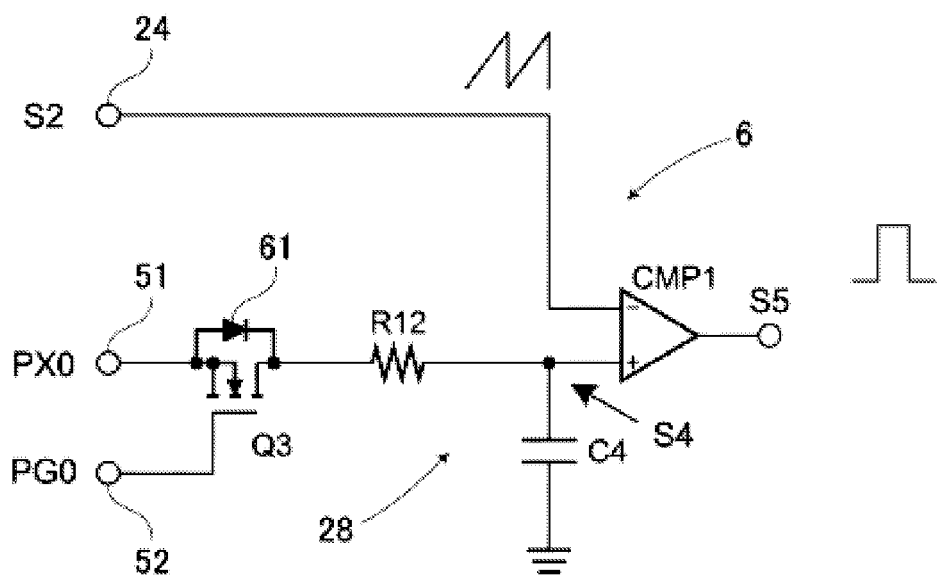
FIG. 6 is a circuit diagram of a pulse control circuit according to yet another embodiment. The pulse control circuit shown in FIG. 6 is a substitute example of the pulse control circuit shown in FIG. 3.

The above embodiment may adopt another example of a pulse control circuit 6 as shown in FIG. 6. The pulse control circuit 6 shown in FIG. 6 uses an N-channel MOSFET as a switching element Q3 so as to control the end-to-end voltage S4 of the capacitor C4. Thus, in response to the above another example, the PWM unit 15 has an I/O port that substitutes for the above mentioned charge terminals PH0, PH1 and discharge terminals PL0, PL1. The I/O port is configured with one or more discharge and charge terminals PX0 and one or more control terminals PG0.

The discharge and charge circuit 28 has an input terminal 51 connected to the discharge and charge terminal PX0 of the PWM unit 15 and an input terminal 52 connected to the control terminal PG0 of the PWM unit 15. In addition, there are the switching element Q3 in which a source is connected to the input terminal 51 and a gate is connected to the input terminal 52, a resistor R12 in which one end of the resistor R12 is connected to a drain of the switching element Q3, and the capacitor C4 in which one end of the capacitor C4 is connected to another end of the resistor R12 and to the non-inverting input terminal of the comparator CMP. Other elements in FIG. 6 are the same as described in FIGS. 3 and 5.

The switching element Q3 may be a P-channel MOSFET, another type of semiconductor devices with a control terminal, or a bipolar transistor. When the bipolar transistor is used as the switching element Q3, the above gate, source and drain correspond to a base, an emitter and a collector, respectively. When the switching element Q3 is a MOSFET, a diode 61 that allows a current to flow from the source to the drain is formed in the MOSFET as the nature of MOSFETs.

The PWM unit 15 outputs a logic signal (an H-level signal or an L-level signal) toward one or more discharge and charge terminals PX0 and the logic signal toward one or more control terminals PG0 based on a difference output value every time the difference output value is calculated by the CPU 14. The PWM unit 15 also adjusts a period of outputting the H-level signal or L-level signal toward the discharge and charge terminal PX0 and toward the control terminal PG0. Other configurations of the power supply device are the same as FIG. 1.

When the difference output value is positive, the PWM unit 15 outputs the H-level signals toward both the discharge and charge terminal PX0 and the control terminal PG0 so as to turn ON the switching element Q3. As a result, the capacitor C4 is charged by the H-level signal supplied from the discharge and charge terminal PX0 through the switching element Q3 and the resistor R12 in this order. Thus, the end-to-end voltage S4 of the capacitor C4 increases. When the switching element Q3 is a MOSFET, the capacitor C4 can be charged through the internal diode 61 without turning ON the switching element Q3. However, it is preferred that the switching element Q3 is turned ON in consideration of a charge loss by the diode 61. When the absolute value of the difference output value becomes larger, the period of outputting the H-level signals toward both the discharge and charged terminal PX0 and the control terminal PG0 becomes longer. In contrast, when the absolute value of the difference output value becomes smaller, this period of outputting the H-level signals becomes shorter. After this period ends, the PWM unit 15 outputs the L-level signals toward both the discharge and charged terminal PX0 and the control terminal PG0. As a result, the end-to-end voltage S4 of the capacitor C4 is maintained.

On the other hand, when the difference output value is negative, the PWM unit 15 outputs the L-level signal toward the discharge and charge terminal PX0 and outputs the H-level signal toward the control terminal PG0 so as to turn ON the switching element Q3. As a result, the capacitor C4 is discharged by the provided L-level signal from the resistor R12 through the switching element Q3 and the discharge and charge terminal PX0 in this order. Thus, the end-to-end voltage S4 of the capacitor C4 decreases. When the absolute value of the difference output value becomes larger, the periods of outputting the L-level signal toward the discharge and charged terminal PX0 and outputting the H-level signal toward the control terminal PG0 become longer. In contrast, when the absolute value of the difference output value becomes smaller, these periods of outputting the H-level and L-level signals become shorter. After this period ends, the PWM unit 15 outputs the L-level signals toward both the discharge and charged terminal PX0 and the control terminal PG0. As a result, the end-to-end voltage S4 of the capacitor C4 is maintained. In this case, because energy is required for discharging and charging the capacitor C4 of the discharge and charge circuit 28, pull-up or pull-down circuits connected to the discharge and charge terminal PX0 are included in the PWM unit 15. At the same time, because energy is required for turning ON and OFF the switching element Q3, pull-up or pull-down circuits connected to the control terminal PG0 are included in the PWM unit 15. Table 3 is a transition table in which the status of the end-to-end voltage S4 of the capacitor C4 is shown in relation to each logic level of the discharge and charge terminal PX0 and the control terminal PG0 in the pulse control circuit 6 shown in FIG. 6.

TABLE 3

| Control Terminal PG0 | Discharge and Charge Terminal PX0 | Voltage S4 of Capacitor C4 |
| --- | --- | --- |
| L | L | Hold |
| L | H | Increase |
| H | L | Decrease |
| H | H | Increase |

The pulse control circuit 6 shown in FIG. 6 is not limited to the configuration discussed above. When the PWM unit 15 has two or more discharge and charge terminals PX0, PX1, . . . , PXN and two or more control terminals PG0, PG1, . . . , PGN, the pulse control circuit 6 can be applied by adding configurations of the discharge and charge circuit 28. In this case, several circuits including the input terminals 51, 52, the switching element Q3, and the resistor R12 may be provided with respect to the discharge and charge terminals PX0, PX1, . . . , PXN and the control terminals PG0, PG1, . . . , PGN. Further, when the resistance value of the resistor R12 in each circuit is differentiated from each other, the same functions and effects can be obtained as the pulse control circuit 6 shown in FIG. 3.

In this embodiment, at predetermined intervals, the CPU 14 also calculates a present control command value based on a digital value, which reflects the output voltage Vout of the converter 2, from the ADC 11 and also calculates a difference output value by comparing the present control command value with the previous control command value. Based on the difference output value, it is determined whether the PWM unit 15 outputs the high-level signal or the L-level signal toward the discharge and charge terminals PX0, PX1, ..., PXN and toward the control terminals PX0, PX1, ..., PXN. In addition, the PWM unit 15 determines the output periods of the high-level signal and the low-level signal output toward the discharge and charge terminals PX0, PX1, ..., PXN and toward the control terminals PX0, PX1, ..., PXN. As a result, the output voltage Vout of the converter 2 becomes stable by discharging and charging the capacitor C4 of the discharge and charge circuit 28. Therefore, it is appropriate that the number of output lines between the microprocessor 4 and the discharge and charge circuit 28 corresponds to at least the number of terminals of the discharge and charge terminals PX0, PX1, ..., PXN and the control terminals PG0, PG1, ..., PGN.

Further, the frequency of the driving signal S5 generated by the comparator CMP is the same as the frequency of the ramp signal S2. Further, the frequency of the ramp signal S2 is synchronized with the clock signal S1. Therefore, not only a frequency of the clock signal S1 but also a frequency of the driving signal S5 can be determined in consideration of the specifications of the converter 2, instead of a processing time for which the CPU 14 calculates the control command values. On the other hand, the frequencies of the high-level signal and the low-level signal toward the discharge and charge terminals PX0, PX1, ..., PXN and toward the control terminals PG0, PG1, ..., PGN having output periods determined based on the difference output value may be lower than the frequency of the ramp signal S2. Thus, when a duty ratio of the driving signal S5 should be finely adjusted, it is not necessary to purposely increase the frequency of the operation clock signal.

As explained above, the driving signal S5 with a finely adjusted duty ratio can be generated by an operation clock signal having a lower frequency than the conventional device. The above features can be achieved with a simple circuit configuration by adding the discharge and charge circuit 28 and without increasing the number of output lines for the output signals from the microprocessor 4.

Figure 7:
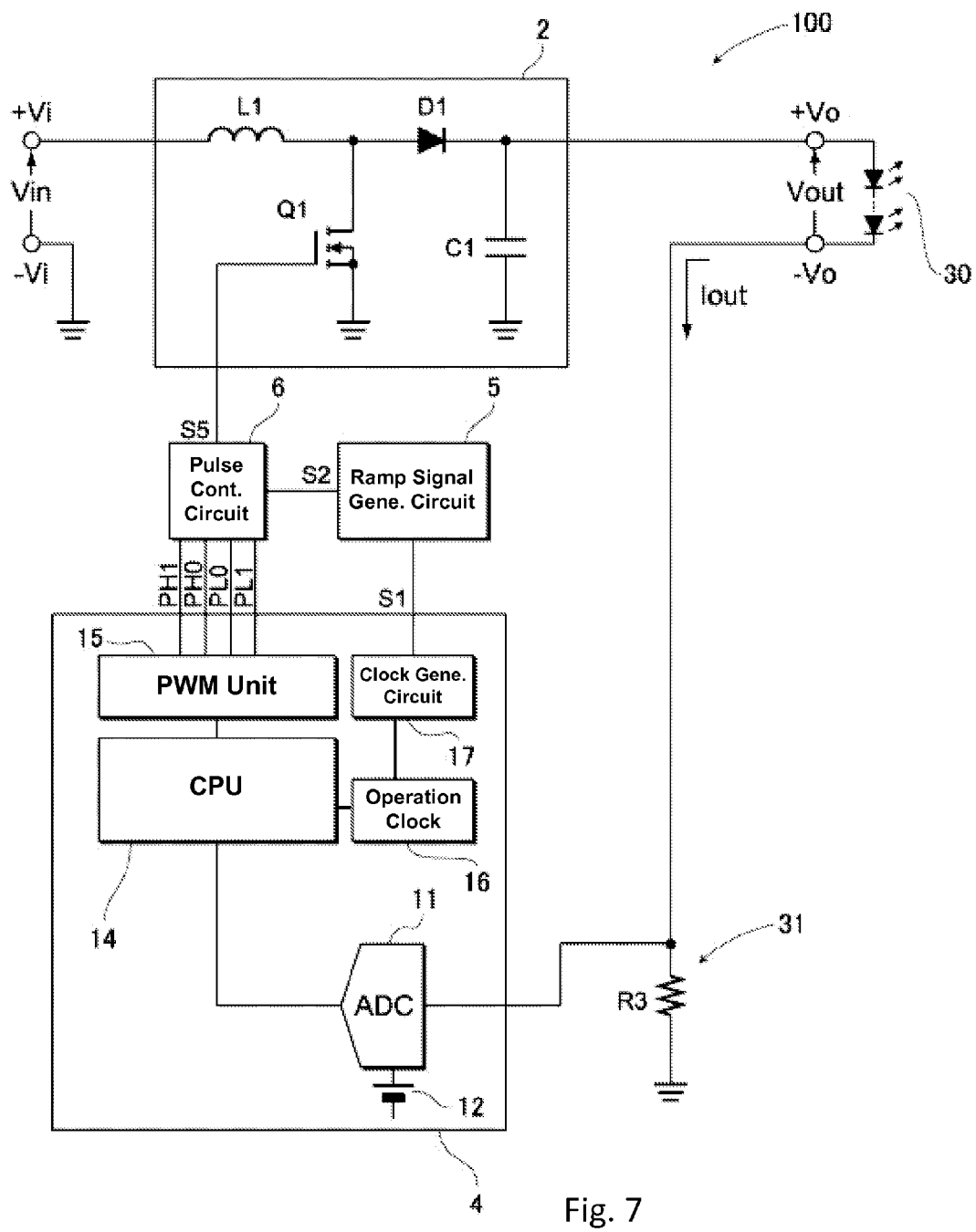
FIG. 7 is a circuit diagram of a light emitting drive device according to a second embodiment of the present invention.

Next, a second embodiment according to the present invention is explained with reference to FIG. 7. The second embodiment relates to a light emitting element drive device in which a load connecting between output terminals +Vo and −Vo is one or more light emitting elements 30. The light emitting element drive device is a constant current output circuit block 100 in which an output current Iout flowing through the light emitting element 30 is controlled to a constant current. The constant current output circuit block 100 is configured with the converter 2 that is an object to be controlled, a current detection circuit 31 that forms a current feedback loop for the converter 2, the microprocessor 4, the ramp signal generation circuit 5, and the pulse control circuit 6. The configurations of the above elements shown in FIG. 7 are the same as the constant voltage output circuit block 1 according to the first embodiment except the current detection circuit 31.

The current detection circuit 31 detects the output current Iout. The current detection circuit 31 is configured by connecting a resistor R3 as a current detector between the converter 2 and the light emitting element 30. An analog detection current having a current value, which is in proportion to the output current Iout, is generated between both ends of the resistor R3. A current detector is not limited to the resistor R3. A current sensor such as a Hall-effect sensor, which has a smaller loss, may be used.

An operation of the light emitting element drive device is the same as the power supply device explained in the first embodiment although the load and the analog detection voltage are replaced with the light emitting element 30 and the analog detection current, respectively. Therefore, the operation is not explained here again. The pulse control circuit 6 can adopt any configuration shown in FIGS. 3, 5 and 6.

The light emitting element drive device according to the present embodiment includes the converter 2 that supplies electric power by performing ON and OFF operations of the switching element Q1, and the microprocessor 4 as a digital circuit that calculates a control command value by a digital arithmetic and that controls the output voltage Vout from the converter 2 to a predetermined value. Thus, the light emitting element 30 is driven by the electric power supplied from the converter 2. The light emitting element drive device also includes the current detection circuit 31 as a current detector that detects the output current Iout for the light emitting element 30. The microprocessor 4 includes: the ADC 11 as a conversion circuit that converts the current value of an analog detection current detected by the current detection circuit 31 into a digital value; the CPU 14 as an arithmetic circuit that receives the operation clock signal, that respectively calculates the previous and present control command values at different timings based on the digital value from the ADC 11 and that calculates a difference output value between the previous and present control command values; and the PWM unit 15 as a signal output circuit that outputs logic signals toward at least one pair of discharge and charge terminals, i.e. an H-level signal toward at least one of the charge terminals PH0, PH1 and an L-level signal toward at least one of the discharge terminals PL0, PL1, based on the difference output value calculated by the CPU 14 and that adjusts the output periods of the H-level signal and the L-level signal for the discharge and charge terminal. Further, there are other elements located outside the microprocessor 4, such as the discharge and charge circuit 28 that includes the capacitor C4, which is charged when the H-level signal is output toward the charge terminals PH0, PH1 and which is discharged when the L-level signal is output toward the discharge terminals PL0, PL1; the ramp signal generation circuit 5 that outputs a serration-shaped or sawtooth wave signal (ramp signal S2) synchronized to the clock signal S1 generated based on the operation clock signal provided to the CPU 14; and the comparator CMP as a driving signal generation circuit that generates the driving signal S5, which is for performing the ON and OFF operation of the switching element Q1, based on a comparison result of comparing the ramp signal S2 with the end-to-end voltage S4 of the capacitor C4.

In the above case, the CPU 14 calculates the present control command value at predetermined intervals based on the digital value, which reflects the output current Iout for the light emitting element 30, from the ADC 11. The CPU 14 calculates the difference output value between the present control command value and the previous control command value. Based on the difference output value, it is determined whether the PWM unit 15 outputs the high-level signal toward the charge terminals PH0, PH1 or whether the PWM unit 15 outputs the low-level signal toward the discharge terminals PL0, PL1. In addition, the PWM unit 15 determines the output periods of the high-level signal and the low-level signal. As a result, the output voltage Vout of the converter 2 becomes stable by discharging and charging the capacitor C4 of the discharge and charge circuit 28. Thus, an operation of the light emitting element 30 becomes stable by stabilizing the output current Iout for the light emitting element 30. Therefore, it is appropriate that the number of output lines between the microprocessor 4 and the discharge and charge circuit 28 corresponds to at least the number of terminals of the charge terminals PH0, PH1 and the discharge terminals PL0, PL1.

Further, the frequency of the driving signal S5 generated by the comparator CMP is the same as the frequency of the ramp signal S2. Further, the frequency of the ramp signal S2 is synchronized with the clock signal S1. Therefore, not only a frequency of the clock signal S1 but also a frequency of the driving signal S5 can be determined in consideration of the specifications of the converter 2, instead of a processing time for which the CPU 14 calculates the control command values. On the other hand, the frequencies of the high-level signal toward the charge terminals PH0, PH1 and the low-level signal toward the discharge terminals PL0, PL1 having output periods determined based on the difference output value may be lower than the frequency of the ramp signal S2. Thus, when a duty ratio of the driving signal S5 should be finely adjusted, it is not necessary to purposely increase the frequency of the operation clock signal.

As explained above, the driving signal S5 with a finely adjusted duty ratio can be generated by an operation clock signal having a lower frequency than the conventional device. The above features can be achieved with a simple circuit configuration by adding the discharge and charge circuit 28 and without increasing the number of output lines for the output signals from the microprocessor 4.

In the case in which the pulse control circuit 6 shown in FIG. 6 is used in the light emitting element drive device, as explained in the first embodiment, the driving signal S5 with a finely adjusted duty ratio can be generated by an operation clock signal having a lower frequency than the conventional device. The above features can be achieved with a simple circuit configuration by adding the discharge and charge circuit 28 and without increasing the number of output lines for the output signals from the microprocessor 4.

Embodiments according to the present invention have been explained. However, the present invention should not be limited to the embodiments because those embodiments are examples for explaining the present invention. Undoubtedly, several modifications may be made without departing from the spirit and scope of the invention. For example, the converter 2 is not limited to a step-up chopper circuit as shown in the drawings. The converter 2 can be a converter with any circuit configuration with one or more switching elements. So long as the output voltage Vout and the output current Iout are stable, a signal level and a logical composition of each part may be changed from the above configuration shown in the embodiments.

The power supply device and the light emitting element drive device being thus described, it will be apparent that the same may be varied in many ways. Such variations are not to be regarded as a departure from the spirit and scope of the invention, and all such modifications as would be apparent to one of ordinary skill in the art are intended to be included within the scope of the following claims.

What is claimed is:

1. A power supply device, comprising:
a converter that supplies electric power by performing an ON and OFF operation of a switching element;
a voltage detector that detects a voltage value of an output voltage of the converter;
a conversion circuit that converts the voltage value into a digital value;
an arithmetic circuit that receives an operation clock signal, that respectively calculates first and second control command values at different timings based on the digital value and that calculates a difference value between the first and second control command values;
a signal output circuit that outputs a first signal or a second signal toward a discharge and charge terminal, that includes a charge terminal and a discharge terminal as a pair, based on the difference value calculated by the arithmetic circuit and that adjusts output periods of the first signal and the second signal;
a discharge and charge circuit that includes a capacitor;
a ramp signal generation circuit that outputs a ramp signal synchronized to a clock signal generated based on the operation clock signal; and
a driving signal generation circuit that generates a driving signal based on a comparison result of the ramp signal with a voltage between both terminals of the capacitor, wherein
the switching element performs the ON and OFF operation according to the driving signal.

2. The power supply device according to claim 1, wherein
a logic level of the first signal is higher than a logic level of the second signal,
when the charge terminal outputs the first signal, the capacitor is charged, and
when the discharge terminal outputs the second signal, the capacitor is discharged.

3. The power supply device according to claim 2, further comprising at least two of the charge terminals and at least two of the discharge terminals.

4. A power supply device, comprising:
a converter that supplies electric power by performing a first ON and OFF operation of a first switching element;
a voltage detector that detects a voltage value of an output voltage of the converter;
a conversion circuit that converts the voltage value into a digital value;
an arithmetic circuit that receives an operation clock signal, that respectively calculates first and second control command values at different timings based on the digital value and that calculates a difference value between the first and second control command values;
a signal output circuit that outputs a first signal or a second signal toward a discharge and charge terminal and the first signal or the second signal toward a control terminal based on the difference value calculated by the arithmetic circuit and that adjusts output periods of the first signal and the second signal;
a discharge and charge circuit that includes a capacitor and a second switching element, the second switching element being provided between the discharge and charge terminal and the capacitor;
a ramp signal generation circuit that outputs a ramp signal synchronized to a clock signal generated based on the operation clock signal; and
a driving signal generation circuit that generates a driving signal based on a comparison result of the ramp signal with a voltage between both terminals of the capacitor, wherein
the first switching element performs the first ON and OFF operation according to the driving signal, and
the second switching element performs a second ON and OFF operation based on the first and second signals from the control terminal.

5. The power supply device according to claim 4, wherein
a logic level of the first signal is higher than a logic level of the second signal,
when the discharge and charge terminal outputs the first signal, the capacitor is charged, and when the discharge and charge terminal outputs the second signal, the capacitor is discharged.

6. The power supply device according to claim 5, further comprising at least two of the discharge and charge terminals, and at least two of the control terminals.

7. A light emitting element drive device, comprising:
a converter that supplies electric power by performing an ON and OFF operation of a switching element;
a light emitting element that is driven by the electric power supplied from the converter;
a current detector that detects a current value of a current flowing in the light emitting element;
a conversion circuit that converts the current value into a digital value;
an arithmetic circuit that receives an operation clock signal, that respectively calculates first and second control command values at different timings based on the digital value and that calculates a difference value between the first and second control command values;
a signal output circuit that outputs a first signal or a second signal toward a discharge and charge terminal, that includes a charge terminal and a discharge terminal as a pair, based on the difference value calculated by the arithmetic circuit and that adjusts output periods of the first signal and the second signal;
a discharge and charge circuit that includes a capacitor;
a ramp signal generation circuit that outputs a ramp signal synchronized to a clock signal generated based on the operation clock signal; and
a driving signal generation circuit that generates a driving signal based on a comparison result of the ramp signal with a voltage between both terminals of the capacitor, wherein
the switching element preforms the ON and OFF operation according to the driving signal.

8. The light emitting element drive device according to claim 7, wherein
a logic level of the first signal is higher than a logic level of the second signal,
when the charge terminal outputs the first signal, the capacitor is charged, and
when the discharge terminal outputs the second signal, the capacitor is discharged.

9. The light emitting element drive device according to claim 8, further comprising at least two of the charge terminals, and at least two of the discharge terminals.

10. A light emitting element drive device, comprising:
a converter that supplies electric power by performing a first ON and OFF operation of a first switching element;
a light emitting element that is driven by the electric power supplied from the converter;
a current detector that detects a current value of a current flowing in the light emitting element;
a conversion circuit that converts the current value into a digital value;
an arithmetic circuit that receives an operation clock signal, that respectively calculates first and second control command values at different timings based on the digital value and that calculates a difference value between the first and second control command values;
a signal output circuit that outputs a first signal or a second signal toward a discharge and charge terminal and the first signal or the second signal toward a control terminal based on the difference value calculated by the arithmetic circuit and that adjusts output periods of the first signal and the second signal;
a discharge and charge circuit that includes a capacitor and a second switching element, the second switching element being provided between the discharge and charge terminal and the capacitor;
a ramp signal generation circuit that outputs a ramp signal synchronized to a clock signal generated based on the operation clock signal; and
a driving signal generation circuit that generates a driving signal based on a comparison result of the ramp signal with a voltage between both terminals of the capacitor, wherein
the first switching element preforms the first ON and OFF operation according to the driving signal, and
the second switching element performs a second ON and OFF operations based on the first and second signals from the control terminal.

11. The light emitting element drive device according to claim 10, wherein
a logic level of the first signal is higher than a logic level of the second signal,
when the discharge and charge terminal outputs the first signal, the capacitor is charged, and
when the discharge and charge terminal outputs the second signal, the capacitor is discharged.

12. The light emitting element drive device according to claim 11, further comprising at least two of the discharge and charge terminals, and at least two of the control terminals.

* * * * *